United States Patent Office  2,951,888
Patented Sept. 6, 1960

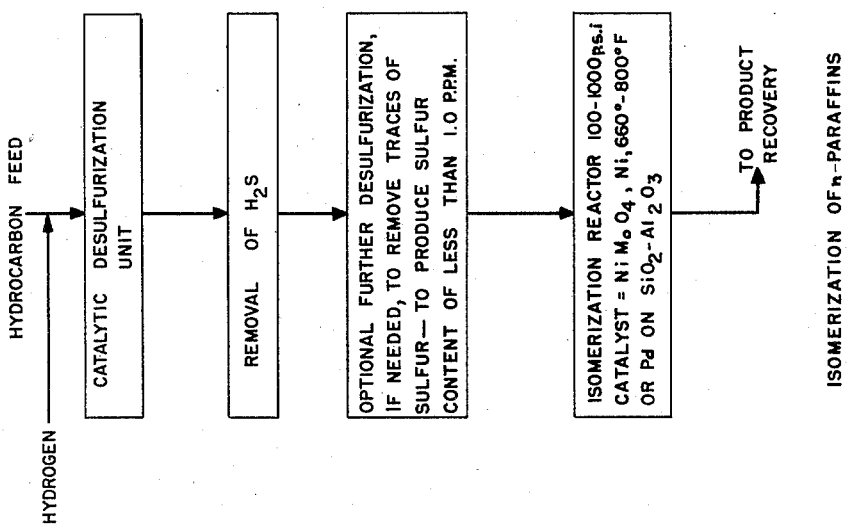
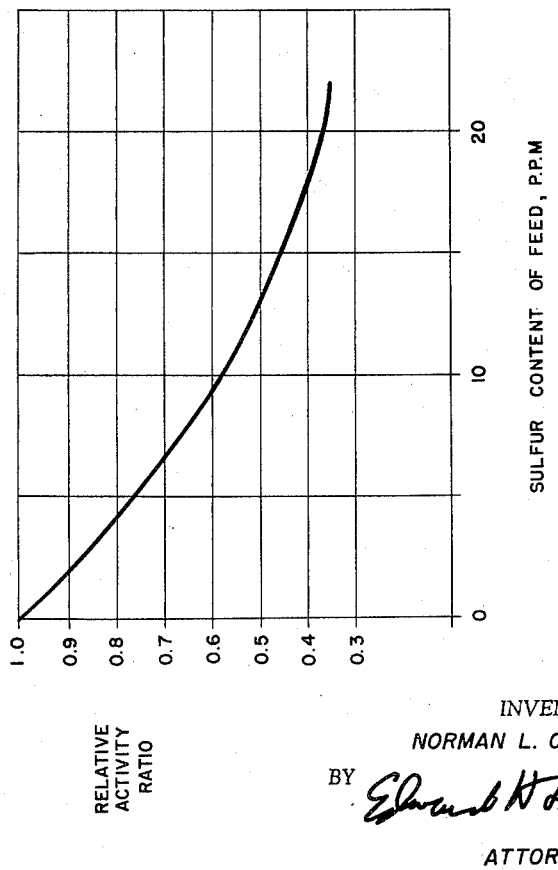

2,951,888

PROCESS FOR DESULFURIZING AND ISOMERIZING LIGHT NORMAL PARAFFINS

Norman L. Carr, Crystal Lake, Ill., assignor to The Pure Oil Company, Chicago, Ill., a corporation of Ohio Filed Apr. 29, 1958, Ser. No. 731,778

9 Claims. (Cl. 260—683.65)

This invention relates to new and useful improvements in processes for the isomerization of $C_4$–$C_7$ normal paraffin hydrocarbons. It is more specifically concerned with the production of branched-chain isomers of $C_4$–$C_7$ saturated paraffin hydrocarbons in the presence of free hydrogen and an isomerization catalyst under isomerizing conditions. More particularly, the process is concerned with a preliminary treatment of the normal paraffin hydrocarbon feed which mitigates and in most cases completely avoids the drastic decrease in catalyst activity with time which is often encountered in isomerization processes.

Branched-chain isomers of $C_4$–$C_7$ normal saturated paraffin hydrocarbons are particularly valuable for use in upgrading gasolines to increase their octane numbers for use in high compression gasoline engines. It is therefore highly desirable to have a convenient and effective process for isomerization of normal $C_4$–$C_7$ hydrocarbons.

Processes have previously been developed to isomerize individual normal paraffin hydrocarbon and mixtures of normal paraffin hydrocarbons of the $C_4$–$C_7$ range by vapor phase contact with various isomerizing catalysts. Catalysts which have been used include platinum on alumina, nickel on silica-alumina, nickel-molybdenum on silica-alumina, and palladium on silica-alumina. These catalysts are not the equivalent of each other for all purposes since the variations in conditions required for isomerizing low-molecular-weight paraffin hydrocarbons vary considerably for these and other isomerization catalysts. Some of the catalysts have also been used under different processing conditions of temperature, pressure, etc., in the reforming of gasoline to increase the aromatic content thereof. It has been found, however, that conditions which are satisfactory for catalytic reforming are not satisfactory for isomerization of pure low-molecular-weight paraffins, or mixtures thereof, or feed stocks which are predominantly paraffinic.

It is, therefore, an object of this invention to provide a new and improved process for the isomerization of hydrocarbon feeds which consist of one or more saturated normal paraffin hydrocarbons of the $C_4$–$C_7$ range.

A further object of this invention is to isomerize $C_4$–$C_7$ normal paraffin hydrocarbons in the presence of free hydrogen at elevated temperatures and pressures over a suitable isomerization catalyst supported on an acidic silica-alumina support.

Another object of this invention is to provide an improved catalytic isomerization process in which the decline of catalyst activity is effectively mitigated.

A feature of this invention is the provision of an improved isomerization process using an isomerization catalyst consisting of nickel, nickel-molybdenum, or palladium on an acidic silica-alumina support in which the hydrocarbon feed has a sulfur content of less than 1 p.p.m. (part per million), thereby mitigating the decline in catalyst activity with time.

Another feature of this invention is the provision of an improved isomerization process in which a hydrocarbon feed consisting of one or more normal saturated paraffin hydrocarbons of the $C_4$–$C_7$ range is desulfurized to a content of less than 1 p.p.m., and the desulfurized feed is isomerized by contact with a metal isomerization catalyst supported on an acidic silica-alumina support, in the presence of free hydrogen at elevated temperatures and pressures.

Other objects and features of this invention will become apparent from time to time throughout the specification and claims as hereinafter related.

In the accompanying drawings, to be taken as part of this specification, there are illustrated certain aspects of this invention, in which drawings:

Fig. 1 is a flow diagram of a preferred embodiment of this invention illustrating the desulfurization of a normal paraffin hydrocarbon feed followed by introduction of the desulfurized feed into a catalytic isomerization reactor for conversion of normal paraffins to isoparaffins, and Fig. 2 is a graph showing the change in catalyst activity of a palladium-on-silica-alumina catalyst for n-pentane feed containing varying amounts of sulfur therein.

This invention consists essentially of a process for the isomerization of $C_4$–$C_7$ saturated normal paraffin hydrocarbons. The hydrocarbons treated in this process may be relatively pure hydrocarbons, or mixtures of one or more of said hydrocarbons, or a hydrocarbon fraction or cut which is predominantly a mixture of normal $C_4$–$C_7$ saturated paraffin hydrocarbons. The hydrocarbon feed is first subjected to a desulfurization process, such as catalytic hydrodesulfurization, including caustic- and water-washing and drying of the effluent, or stabilization, to reduce the sulfur content to the range of about 5–50 p.p.m. This hydrocarbon feed is heated to an elevated temperature, preferably about 400–800° F. (although higher temperatures may be used), and passed through a desulfurization reactor or guard case containing a suitable desulfurizing reactant to fix and remove sulfur without the formation of hydrogen sulfide. Desulfurizing catalysts which are well known in the prior art for removing sulfur (as hydrogen sulfide) from hydrocarbons include various metals such as copper, nickel, iron, molybdenum and cobalt, and their oxides and various compounds thereof, such as copper molybdate, cobalt molybdate, nickel molybdate, etc., preferably supported on a silica, silica-alumina, or alumina support. Such materials are also effective as reactants in a guard-case to fix and remove sulfur without the formation of hydrogen sulfide. The desulfurization catalyst and reactant may be the same as the catalyst used in the isomerization reaction. Fixation of the last sulfur from the hydrocarbon stream is accomplished by the action of the guard-case material as a reactant for sulfur compounds, and the sulfur-containing products therefrom are held within the guard case. This chemical treatment usually reduces the sulfur content of the feed to less than about 1 p.p.m. and may produce a sulfur content of practically zero. The completely desulfurized hydrocarbon feed is then passed to the isomerization reactor, at a temperature of 650–800° F., with free hydrogen at a total pressure in the range of 100–1000 p.s.i.g. The isomerization reactor contains a catalyst such as nickel, nickel-molybdenum (reduced nickel molybdate), or palladium, supported on an acidic silica-alumina (50–90% silica) support. It is to be noted that these catalysts are not considered equivalent for all purposes and are considered together here only because of their common sensitivity to trace amounts of sulfur under isomerization reaction conditions. The product from the catalytic isomerization reactor contains a high proportion of isoparaffins. By thoroughly desulfurizing the hydrocarbon feed stock before introducing the same to the isomerization reactor, it is possible to carry out the isomerization reaction for extended periods of time without loss in catalyst activity. Some of these catalysts, when used under high-temperature reforming conditions, will tolerate a sulfur concentration of 30–50 p.p.m. in the hydrocarbon feed without decline in catalyst activity. In fact, platinum on alumina is sometimes used under reforming conditions with hydrocarbon feeds having added sulfur. In the design of an isomerization plant using a palladium on silica-alumina catalyst, a reduction of the sulfur content of the feed from 13 p.p.m. to less than 1 p.p.m. will permit a 50% reduction in the reaction size. This effect of removing substantially all of the sulfur, to a concentration less than 1 p.p.m., in this isomerization process was completely unexpected from the prior art disclosures.

EXAMPLE I

Referring now to Fig. 1 of the drawings, there is shown a flow diagram for the process of my invention. Technical grade n-pentane, containing more than 20 p.p.m. of sulfur, is introduced into a catalytic desulfurization unit along with a suitable supply of hydrogen (at a mol ratio of hydrogen to hydrocarbon of 1.5 to 3.0) and subjected to conventional catalytic hydrodesulfurization conditions to remove the major proportion of sulfur. The hydrocarbon effluent from the catalytic desulfurization unit may have a sulfur content of less than about 2 p.p.m. If it is less than about 1 p.p.m., no further desulfurization treatment is necessary. If not, the catalytically desulfurized pentane flows through a guard-case containing nickel molybdate before entering the isomerization reactor, for removal of substantially all of the remaining sulfur from the feed. The guard case or supplemental desulfurization unit is provided with a reactant consisting of 15% reduced nickel molybdate on a 75% silica-25% alumina support, which reactant is capable of reducing the sulfur content of the pentane practically to zero, to a value substantially less than 1 p.p.m. The desulfurized pentane feed then passes to a catalytic isomerization reactor. The reactor contains a catalyst, consisting of 10% nickel molybdate on 75% silica-25% alumina acidic catalyst support, which has been activated by a conventional oxidation-reduction cyclic technique. The reaction in the isomerization reactor is carried out under a pressure of 500 p.s.i.g., at 700–710° F. using a hydrogen/pentane mol ratio of 2.0 and a pentane liquid volume hourly space velocity of 1.5. Under these reaction conditions, the effluent hydrocarbons from the isomerization reactor contained 42% isopentane and 45% n-pentane, which represented a yield per pass of 41%, a conversion per pass of 53%, and selectivity of 77%. This run was continued for a period of 6 hours during which time the yield of isopentane actually increased slightly with time.

EXAMPLE II

In another experiment, technical-grade pentant having an initial sulfur content of 22 p.p.m. was hydrodesulfurized, caustic-washed, water-washed and dried to reduce the sulfur content to less than 10 p.p.m. The catalytically desulfurized pentane was then passed through a second desulfurizer unit, containing a 10% reduced nickel molybdate on a 75/25 silica-alumina support, at a temperature of 550° F. and pressure slightly over 500 p.s.i.g. The pentane was fed at a liquid volume hourly space velocity of 3.0 together with water vapor at a partial pressure of 15 mm. Hg, and hydrogen in a hydrogen pentane ratio of 1.2. The sulfur content of the pentane was reduced in the second desulfurization step to substantially less than 1 p.p.m. The completely desulfurized pentane was then heated and passed into a catalytic isomerization reactor where it was contact with a catalyst consisting of 10% reduced nickel molybdate supported on a 75% silica-25% alumina acidic catalyst, as carrier. The reaction was carried out in the isomerization reactor at a pressure of about 500 p.s.i.g., and temperature of 700° F. The product from the reactor contained about 32% isopentane constituting a yield of about 31%, a conversion of 36%, and selectivity of 87%. This run was carried out for a period of 6 hours during which time the isopentane yield actually increased slightly with time.

EXAMPLE III

Another experiment was carried out following the procedure of Examples I and II using nickel molybdate on silica-alumina as reactant in the second desulfurization step 5, and a catalyst consisting of 3% nickel metal on 75% silica-25% alumina, as catalyst support, in the isomerization reactor. The pressure in the second desulfurization unit and the isomerization reactor was maintained at about 500 p.s.i.g. The second desulfurizer unit was maintained at a temperature of 550° F. while the isomerization reactor was maintained at 740°–750° F. Pentane feed and hydrogen were charged at a hydrogen/pentane mol ratio of 1.0, a liquid volume hourly space velocity of 3.0. The feed contained a small amount of water vapor at a partial pressure of 10–15 mm. Hg. Isopentane yield in the effluent from the isomerization reactor remained constant for a period of 17 hours at which time the test was terminated. This run produced an isopentane yield of 37%, conversion of 40%, and selectivity of 92%.

EXAMPLE IV

In still another run, technical-grade n-pentane, containing 22 p.p.m. of sulfur, and hydrogen, in a hydrogen/pentane mol ratio of 1.5, were fed directly to the isomerization reactor using a freshly prepared catalyst of identical composition with the catalyst used in Examples I and II. It should be noted that naphthas containing 22 p.p.m. of sulfur are considered satisfactory feed stock for catalytic reforming, at temperatures of 850°–1000° F. This isomerization reaction was carried out at a pressure of 500 p.s.i.g., a temperature of 720° F., and a liquid volume hourly space velocity of 3.0. The initial product from the reactor in this run contained 33.6% isopentane, corresponding to a yield of 32.4% and selectivity of 95%. This run was continued for a period of 24 hours during which time the yield of isopentane decreased at a constant rate of about 0.7 unit per hour.

EXAMPLE V

In another run, technical-grade n-pentane having a sulfur content of 22 p.p.m. was hydrodesulfurized, caustic-washed, water-washed, and dried to reduce the sulfur content to 2–5 p.p.m. This feed, however, was not passed through the second desulfurizer unit to remove the remaining sulfur as in Examples I to III. The partially desulfurized n-pentane feed was introduced directly into the catalytic isomerization reactor at a temperature of 700° F., pressure of 500 p.s.i.g., and a liquid volume hourly space velocity of 3.0, together with hydrogen in a hydrogen/pentane mol ratio of 1.0. The product from the reactor initially represented an isopentane yield of 25% and selectivity of 96%. This run was continued for a period of 32 hours during which time the yield of isopentane decreased at a rate of 0.4 unit per hour.

From the foregoing examples, it is apparent that even trace amounts of sulfur in the n-pentane feed result in a substantial permanent impairment of the isomerization reaction. When the sulfur content of the feed is reduced to substantially zero (less than 1 p.p.m.), the isoparaffin field from the isomerization reactor either remains constant or increases with time on stream.

EXAMPLE VI

Technical-grade n-pentane was catalytically and chemically desulfurized to a sulfur content less than 1 p.p.m. as in Examples I to III. The desulfurized n-pentane and hydrogen in a hydrogen/n-pentane mol ratio of 2.2 were introduced into the catalytic isomerization reactor. In this run the catalyst used was 0.4% palladium metal on a 87–13 silica-alumina support. The reaction was carried out at a temperature of 775° F., a pressure of 600 p.s.i.g., and a liquid volume hourly space velocity of 3.5. The product from the reactor contained about 55% isopentane, representing a yield of 55% and selectivity of 98%. This run was continued for a period of more than 400 hours during which time the yield of isopentane remained constant.

EXAMPLE VII

In another run the following data were obtained which show the effect of sulfur in the feed for the isomerization of n-pentane over a palladium-silica-alumina catalyst. Technical grade n-pentane containing 20 p.p.m. sulfur was fed to the isomerization reactor. The catalyst contained 0.4% Pd on a 75/25 silica-alumina support. The operating conditions were as follows: pressure, 700 p.s.i.g., hydrogen/pentane mol ratio, 2.0; LVHSV, 2.0; and temperature, 725° F. The variation of yield with time on stream is shown in Table I below:

Table I

| Time on Stream, hr. | Yield of i-C₅, percent | Selectivity, percent |
|---|---|---|
| 0 | 47.4 | 98.9 |
| 1.3 | 33.4 | 99.1 |
| 3.5 | 31.4 | 99.0 |
| 6.0 | 30.5 | 99.5 |

EXAMPLE VIII

In still another run the following data were obtained which show the effect of sulfur in the feed for pentane isomerization, and the recovery of the catalytic activity when the feed is void of sulfur. The catalyst contained 0.6% Pd on 75/25 silica-alumina support. The operating conditions were as follows: pressure, 700 p.s.i.g.; hydrogen/pentane mol ratio, 2.0; LVHSV, 2.0; and temperature 700° F. The variation of yield with time on stream and the recovery of catalyst activity with a pure feed are shown in Table II below:

Table II

| Time on Stream, hr. | i-C₅ Yield, percent | Sulfur in feed p.p.m. |
|---|---|---|
| 0 | 44.0 | 16 |
| 0.7 | 42.2 | 16 |
| 1.5 | 39.6 | 16 |
| 2.2 | 38.4 | 16 |
| 3.0 | 38.5 | 16 |
| 3.7 | 40.6 | 0 |
| 4.5 | 43.1 | 0 |
| 5.0 | 43.4 | 0 |

In addition to the foregoing examples a number of experiments were run and the results graphically illustrated in Fig. 2. This graph shows the effect of sulfur in the hydrocarbon feed on the steady-state activity of a palladium catalyst. The reaction rate constants (K) in the various experiments were calculated by the equation:

$$K = (\text{LHVSV}) \ln \left( \frac{1}{1 - x/x_e} \right)$$

where $x$=fractional yield, $x_e$=equilibrium yield. The relative activity ratio was determined as the ratio of isomerization reaction rate when sulfur is present in the hydrocarbon feed divided by the initial reaction rate. This therefore provides a measure of relative activity which is independent of test levels of yield and space velocity. As is apparent from the graph the decline in activity attributable to trace amounts of sulfur is very great.

It is to be further noted that the catalyst poisoning by trace amounts of sulfur is similar for isomerization of $C_4$–$C_7$ n-paraffins other than n-pentane. When this process is carried out using n-paraffins of the $C_4$–$C_7$ range or mixtures thereof or naphtha cuts containing a large proportion of $C_4$–$C_7$ n-paraffins it is necessary for a practical process to maintain a sulfur concentration of less than 1 p.p.m.

From the foregoing examples, it is seen that the isomerization of low-molecular-weight normal paraffin hydrocarbons using nickel, nickel-molybdena, or palladium metal catalysts supported on an acidic silica-alumina (50–90% silica) support is unique in its extreme sensitivity to the presence of sulfur in the hydrocarbon feed. Metal catalysts when used for reforming of hydrocarbons at temperatures of 900° F. and above will tolerate sulfur in the hydrocarbon feed to the extent of 20 p.p.m. and more. Low-temperature isomerization with anhydrous aluminum chloride catalysts will similarly tolerate large amounts of sulfur in the hydrocarbon feed (see U.S. Patents 2,389,659 and 2,389,660). However, when the hydroisomerization of $C_4$–$C_7$ paraffins is attempted using a nickel, nickel-molybdena, or palladium catalyst supported on an acidic silica-alumina support, at temperatures of 650°–800° F., the presence of even trace amounts of sulfur in the hydrocarbon feed is objectionable. In the case of base metal catalysts containing nickel, molybdenum, etc., the presence of any measurable amount of sulfur in the hydrocarbon feed results in the permanent loss of catalyst activity. The catalyst activity cannot be regained by subsequently reducing the sulfur content of the feed to zero. Furthermore, the sulfur-poisoned catalyst cannot be effectively reactivated by the usual oxidation-reduction technique. When noble metal catalysts such as palladium are used, the effect of sulfur in the feed is very different. The catalyst activity diminishes with increasing amounts of sulfur. For any given sulfur concentration, the catalyst activity will diminish rapidly with time to a steady-state level at which it will remain indefinitely, so long as the sulfur content is constant. Since these catalysts are hydrogenation catalysts, the same weight of sulfur (as $H_2S$) leaves the reactor as that which enters as organic sulfur-containing compounds. Thereafter, when the sulfur content of the feed is reduced to zero, the catalyst regains its initial activity in a few hours. It is therefore apparent that a sulfur content in the hydrocarbon feed of practically zero (less than 1 p.p.m.) must be maintained if undue loss in catalyst activity is to be avoided.

While I have described my invention fully and completely as required by the patent statutes, I wish it to be understood that within the scope of the appended claims this invention may be practiced otherwise than as specifically described.

What is claimed is:

1. A hydroisomerization process which comprises treating a feed stock consisting essentially of at least one normal paraffin hydrocarbon in the $C_4$–$C_7$ range having a sulfur content in excess of 1 p.p.m. to reduce the sulfur content to a value less than about 1 p.p.m., contacting a mixture of the desulfurized feed stock and hydrogen with a catalyst selected from the group consisting of nickel, nickel-molybdenum, and palladium, supported on an acidic silica-alumina support containing 50–90% silica, at a temperature of 650°–800° F., pressure of 100–1000 p.s.i.g., and hydrogen/hydrocarbon mol ratio of 0.5–5.0.

2. A process in accordance with claim 1 in which the catalyst consists of nickel supported on a silica-alumina support containing 75–85% silica.

3. A process in accordance with claim 1 in which the catalyst consists of reduced nickel molybdate supported on a silica-alumina support containing 75–87% silica.

4. A process in accordance with claim 1 in which the catalyst consists of palladium supported on a silica-alumina support containing 75–87% silica.

5. A process in accordance with claim 1 in which a sulfur-containing hydrocarbon feed is hydrodesulfurized and freed of hydrogen sulfide to reduce the sulfur content to less than 0.001% and then further desulfurized to produce a feed having a sulfur content substantially less than 1 p.p.m.

6. A process in accordance with claim 5 in which the further desulfurization is carried out by contacting the hydrocarbon feed in the gas phase at 400°–800° F. with a reactant of the group consisting of copper, iron, nickel, cobalt, molybdenum and their oxides, and mixtures thereof.

7. A process in accordance with claim 6 in which the isomerization catalyst consists of nickel supported on a silica-alumina support containing 75–87% silica.

8. A process in accordance with claim 6 in which the isomerization catalyst consists of reduced nickel molybdate supported on a silica-alumina support containing 75–87% silica.

9. A process in accordance with claim 6 in which the isomerization catalyst consists of palladium supported on a silica-alumina support containing 75–87% silica.

References Cited in the file of this patent

UNITED STATES PATENTS

| | | |
|---|---|---|
| 2,376,086 | Reid | May 15, 1945 |
| 2,718,535 | McKinley et al. | Sept. 20, 1955 |
| 2,769,760 | Annable et al. | Nov. 6, 1956 |

FOREIGN PATENTS

| | | |
|---|---|---|
| 487,392 | Canada | Oct. 21, 1952 |